United States Patent [19]
Ito et al.

[11] Patent Number: 4,809,181
[45] Date of Patent: Feb. 28, 1989

[54] AUTOMOTIVE YAW-SENSITIVE BRAKE CONTROL SYSTEM

[75] Inventors: Ken Ito; Yoshiki Yasuno, both of Kanagawa, Japan

[73] Assignee: Nissan Motor Company, Limited, Yokohama, Japan

[21] Appl. No.: 735,980

[22] Filed: May 20, 1985

[30] Foreign Application Priority Data

May 21, 1984 [JP] Japan ................ 59-100655

[51] Int. Cl.$^4$ .............................. B60T 8/64
[52] U.S. Cl. .................. 364/426.01; 303/103; 303/100
[58] Field of Search ........... 364/426; 303/103, 106, 303/110, 100, 92, 96; 180/79.1, 141, 142

[56] References Cited

U.S. PATENT DOCUMENTS

| | | | |
|---|---|---|---|
| 3,797,892 | 3/1974 | Leiber | 303/106 |
| 4,005,910 | 2/1977 | Leiber et al. | 303/96 |
| 4,033,635 | 7/1977 | Montoya | 303/109 |
| 4,254,998 | 3/1981 | Marshall et al. | 303/92 |
| 4,593,955 | 6/1986 | Leiber | 303/106 |

FOREIGN PATENT DOCUMENTS 1902944  8/1970 Fed. Rep. of Germany .
2112669 10/1972 Fed. Rep. of Germany .

OTHER PUBLICATIONS

*Bosch Technische Berichte*, 7 (1980) 2, pp. 68, 77, and 82.

*Primary Examiner*—Parshotam S. Lall
*Assistant Examiner*—Thomas G. Black
*Attorney, Agent, or Firm*—Foley & Lardner, Schwartz, Jeffrey, Schwaab, Mack, Blumenthal & Evans

[57] ABSTRACT

Automotive brake control is performed by controlling brake pressure at front and rear wheels independently. The braking force at each of the front and rear wheels is controlled in accordance with monitored vehicle driving conditions so that the steering characteristics of the vehicle are held to predetermined characteristics even when vehicular brakes are applied during cornering. The braking pressure at front wheels is decreased when understeer characteristics increases due to braking. On the other hand, the braking pressure at the rear wheel is decreased when oversteer characteristics increases due to braking.

29 Claims, 5 Drawing Sheets

AUTOMOTIVE YAW-SENSITIVE BRAKE CONTROL SYSTEM

BACKGROUND OF THE INVENTION

The present invention relates generally to a brake control system for an automotive vehicle, which controls braking pressure at the front and rear wheels independently. More specifically, the invention relates to an automotive brake control system which controls yawing of vehicle by adjusting the braking force on the front and rear wheels independently, and thereby affords the vehicle good steering characteristics.

In the recent years, various anti-skid brake control systems for automotive vehicles have been developed. Among these systems, some control braking pressure at each wheel independently. Although such anti-skid brake control systems were developed specifically to optimize braking characteristics by preventing the vehicular wheels from locking, they are also known to provide greater cornering force so as to help prevent vehicle spinning, even when the brakes are applied during cornering.

In these prior art systems, anti-skid brake control is generally performed under low-friction, slippery road surface conditions, such as roads covered with snow, ice and so forth, on which vehicular wheels tend to skid easily. On the other hand, when road/tire friction is high enough, anti-skid brake control systems frequently remain inactive. On relatively high-friction road surfaces, the brake feeling is substantially the same as during manual braking even when the anti-skid control systems are indeed active. However, even under high-friction road conditions, vehicular wheels may slip when the brakes are applied during cornering. This slip decreases the cornering force and thus adversely affects the steering characteristics of the vehicle. For instance, when the vehicular cornering speed is relatively high, wheel slip may be sufficiently bad to allow over-steering effects such as tack-in or spin as the centrifugal force overcomes the cornering force. In such cases, the vehicle can go out of control.

SUMMARY OF THE INVENTION

Therefore, it is a principle object of the invention to provide a brake control system which can adjust braking pressure at each wheel independently and in accordance with yawing force exerted on the vehicle.

Another and more specific object of the invention is to provide a brake control system which controls steering characteristics while braking through a corner by controlling the slip of each wheel by adjusting the braking pressure at each wheel independenlty.

In order to accomplish the aforementioned and other objects of the present invention, braking pressure is controlled separately for the front and rear wheels. The braking pressure for the front and rear wheels is controlled in accordance with vehicle driving conditions to optimize steering characteristics even when the brakes are applied during cornering. Specifically, the braking pressure at the front wheels is decreased when understeering increases due to braking. On the other hand, the braking pressure at the rear wheels is decreased when oversteering increases due to braking.

According to one aspect of the invention, an automotive brake control system comprises a first hydraulic brake circuit for applying braking pressure to vehicular front wheels, the first hydraulic circuit including a first braking pressure controlling actuator which is operable to increase the braking pressure in its first position, to hold the braking pressure constant in its second position and to decrease the braking pressure in its third position, a second hydraulic brake circuit for applying braking pressure to vehicular rear wheels, the second hydraulic circuit including a second braking pressure controlling actuator which is operable to increase the braking pressure in its first position, to hold the braking pressure constant in its second position and to decrease the braking pressure in its third position, a first sensor for producing a first sensor signal when the vehicle brakes are applied, a second sensor for producing a second sensor signal having a value representative of the forces applied in the transverse direction to the vehicle, a third sensor for producing a third sensor signal having a value representative of a vehicle driving condition, and a controller for controlling the first and second actuators independently of each other, the controller deriving a vehicle driving stability factor from the first sensor signal value and controlling the first and second actuators to one of the first, second and third positions so as to hold the vehicle driving stability factor at a given value.

According to another aspect of the invention, a method for controlling steering characteristics to coincidence with desired characteristics comprising the steps of monitoring vehicle driving conditions including whether or not vehicular brakes have been applied, deriving a steering characteristics coefficient on the basis of the monitored driving conditions, monitoring variation of the steering characteristics coefficient while vehicular brakes are applied to decelerate the vehicle, deriving a first and second threshold value on the basis of the vehicle driving conditions and the steering characteristics coefficient, comparing the steering characteristics coefficient with the first threshold value and controlling the first brake circuit so as to adjust braking pressure applied to the front wheels in such a manner that the steering characteristics coefficent is held in a predetermined relationship with the first threshold value, and comparing the steering characteristics coefficient with the second threshold value and controlling the second brake circuit so as to adjust braking pressure applied to the rear wheels in such a manner that the steering characteristics coefficent is held in a predetermined relationship with the second threshold value.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
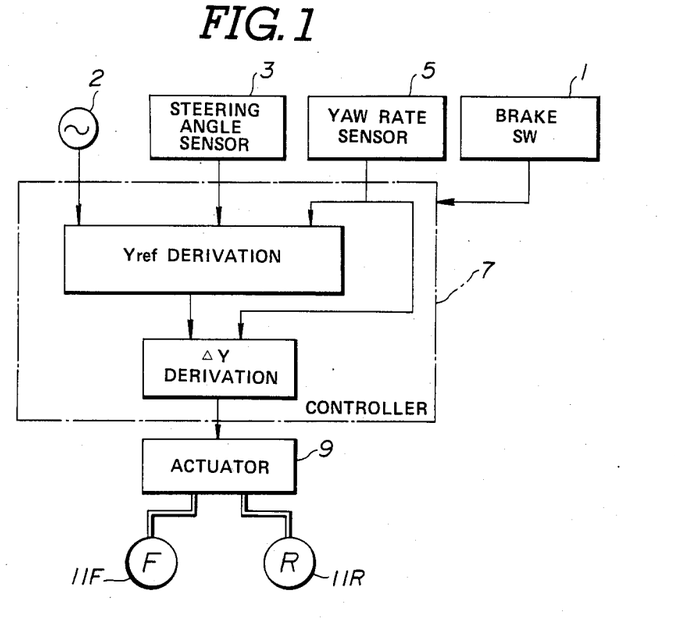
FIG. 1 is a schematic block diagram of the preferred embodiment of a brake control system according to the invention, which shows general arrangement of the brake control system for help in explaining the general concept of the invention.

Referring now to the drawings, particularly to FIG. 1, the preferred embodiment of a brake control system according to the invention includes hydraulic pressure actuators 9. The actuators 9 are disposed in a hydraulic brake circuit including front and wheel cylinders which are generally denoted by the reference number 11. The actuators 9 are associated with a controller 7 which comprises a microprocessor. The controller 7 is connected to a brake switch 1, a vehicle speed sensor 2, a steering angle sensor 3, and a yaw rate sensor 5.

The brake switch 1 produces a braking state indicate signal Sb. In practice, the braking state indicative signal Sb remains HIGH while the brakes are manually applied. The vehicle speed sensor 2 monitors the average speed of the two rear wheels and produces a corresponding vehicle speed indicative signal Sv. The steering angle sensor 3 monitors steering wheel adjustments from its neutral position and produces a steering angle indicative signal Sst indicative of the angular steering displacement from the neutral position. The yaw rate sensor 5 monitors the yawing motion of the vehicle body and produces a yaw rate indicative signal Sy representative of the magnitude of the vehicular yawing motion.

The controller 7 responds to a HIGH level brake state indicative signal Sb by deriving a yaw rate threshold value Yref on the basis of the vehicle speed indicative signal value V, the steering angle indicative signal value ST and the yaw rate indicative signal value Y. The controller 7 compares the yaw rate indicative signal value Y with the yaw rate threshold Yref to find the difference $\Delta Y$ between the yaw rate indicative signal value Y and the yaw rate threshold Yref. On the basis of the difference $\Delta Y$, the controller derives a control signal Sc used to control the front and rear braking pressure by means of the actuators 9. In practice, the actuators 9 consist of two separate hydraulic actuators 9F, 9R which control the fluid pressure applied to the front and rear wheel cylinders 11F and 11R, respectively, independently of each other. Each of the front and rear brake actuators 9F and 9R is operable in an APPLICATION mode in which braking pressure in the wheel cylinders is increased, in a HOLD mode in which braking pressure is held constant, and in a RELEASE mode in which braking pressure is decreased.

The yaw rate threshold Yref represents a criterion for recognizing transverse slip of the wheels. Specifically, a positive difference $\Delta Y$ signifies under-steering and a negative difference $\Delta Y$ represents over-steering. The controller 7 derives two control signals for the braking pressure at the front and rear wheels independently so as to neutralize this steering parameter. In practice, the controller 7 derives a front brake control signal SFc and a rear brake control signal SRc. The front and rear brake control signals SFc and SRc order the respective front and rear brake actuators 9F and 9R into one of the aforementioned operation modes, i.e. APPLICATION mode, HOLD mode and RELEASE mode.

The structured and operation of the preferred embodiment of the brake control system according to the invention will be explained with reference to FIGS. 2 to 13.

Figure 2:
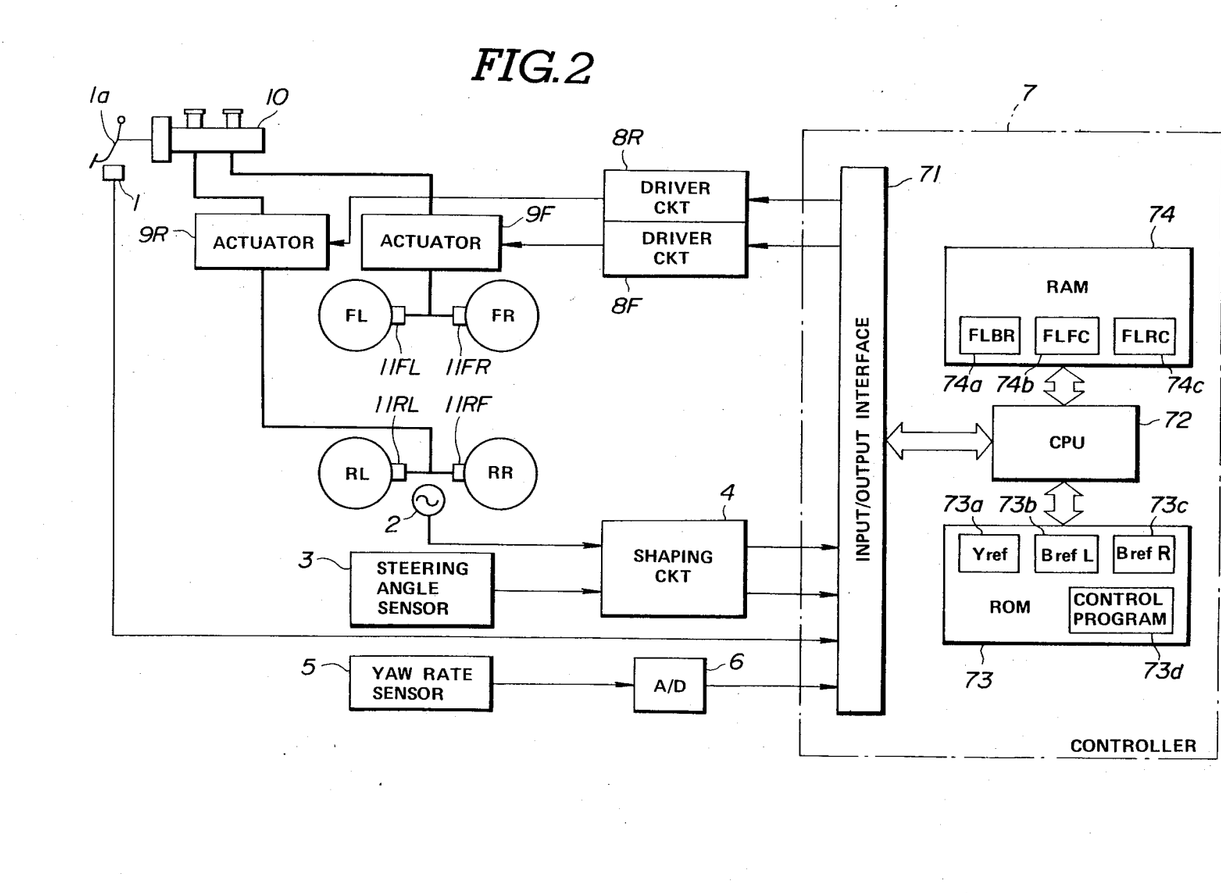
FIG. 2 is a block diagram of the preferred embodiment of the brake control system of FIG. 1, which shows the arrangement of FIG. 1 in greater detail.

FIG. 2 shows the preferred embodiment of the brake control system in greater detail. As set forth above, the brake switch 1 detects application of the brakes. The brake switch 1 is associated with a brake pedal 1a which is connected to a brake master cylinder 10 of the hydraulic brake system.

As is well known, the master cylinder 10 accumulates fluid pressure by which braking is actuated according to how far the brake pedal 1a is depressed. The master cylinder 10 is connected to a front hydraulic brake circuit and a rear hydraulic brake circuit. The front hydraulic brake circuit includes left and right front wheel cylinders 11FL and 11FR and the front brake actuator 9F. Similarly, the rear hydraulic brake circuit includes left and right wheel cylinders 11RL and 11RR and the rear brake actuator 9R.

Figure 3:
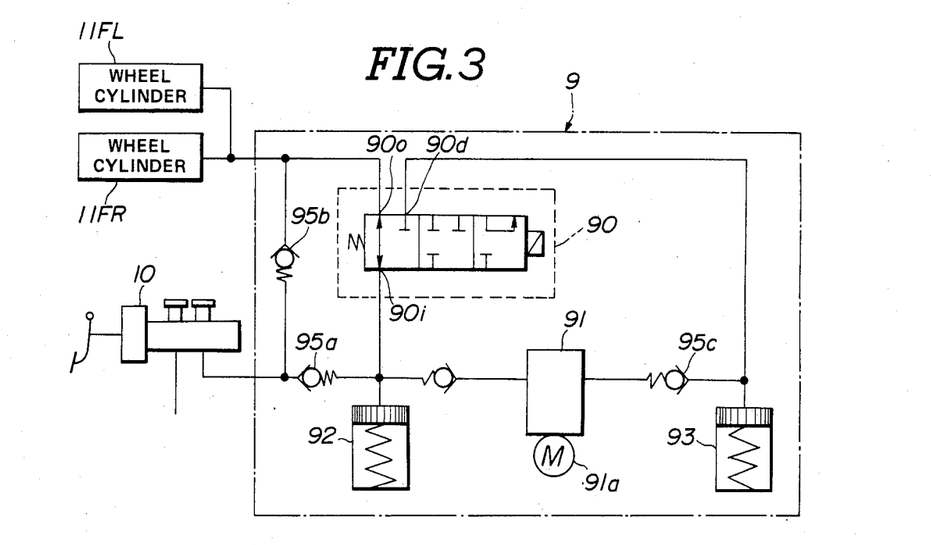
FIG. 3 is a hydraulic circuit diagram of the preferred embodiment of brake control system.

FIG. 3 shows the circuit lay-out of the front hydraulic brake circuit. The rear hydraulic brake circuit has substantially the same circuit lay-out and thus will not be mentioned again. It should be noted that the brake circuit illustrated in FIG. 3 is merely an example used to illustrate the invention and is not intended to limit the invention to the specific lay-out of FIG. 3.

In FIG. 3, the front brake actuator 9F generally comprises an electromagnetical flow control valve 90, a fluid pump 91, a pressure accumulator 92 and a fluid reservoir 93. The flow control valve 90 is actuated by an electromagnetic solenoid to one of the APPLICATION, HOLD or RELEASE mode positions. As shown in FIG. 3, the flow control valve 90 has an inlet port 90i, an outlet port 90o and a drain port 90d. In the APPLICATION mode position, fluid communication between the inlet port 90i and the outlet port 90o is established. When the flow control valve 90 is operated in the HOLD mode, the ports 90i, 90o and 90d are all disconnected. On the other hand, in RELEASE mode, the outlet port 90o is connected to the drain port 90d. The inlet port 90i receives pressurized fluid from the master cylinder 10 via a check valve 95a. The inlet port 90i is also connected directly to the pressure accumulator 92. The outlet port 90o is connected directly to the left and right front wheel cylinders 11FL and 11FR. The outlet port 90o is also connected for output to the master cylinder outlet line via a pressure regulator valve 95b. The drain port 90d is connected directly to the fluid reservoir 94 and is also connected for output to the fluid pump 91 via a check valve 95c.

The fluid pump 91 is driven by an electric motor 91a while the flow control valve 90 is in the RELEASE mode position. The fluid pump 91 drives working fluid out of the wheel cylinders 11 and into the pressure accumulator 92 via a check valve 95d for use in the next APPLICATION mode cycle.

Returning to FIG. 2, the brake switch 1 is connected directly to an input/output interface 71 of a microprocessor serving as the controller 7. The vehicle speed sensor 2 and the steering angle sensor 3 are also connected to the input/output interface 71 via a shaping circuit 4. The yaw rate sensor 5 is also connected to the input/output interface 71 via an analog-to-digital (A/D) converter 6. The input/output interface 71 of the controller 7 is in turn connected for output to driver circuits 8F and 8R, each of which is connected to one of the front and rear brake actuators 9F and 9R. The microprocessor 7 also has a CPU 72, a ROM 73 and a RAM 74. RAM 74 has flag registers 74a, 74b and 74c respectively for a set/reset braking state flag FLBR, a front brake control state flag FLFC and a rear brake control state flag FLRC. ROM 73 has a memory block 73a storing a table of yaw rate threshold values Yref arrayed as a function of the vehicle speed signal value V, the steering angle signal value ST and the yaw rate signal value Y. ROM 73 also has memory blocks 73b and 73c respectively storing front and rear mode switching criteria BFref and BRref for comparison with the difference ΔY between the yaw rate signal value Y and the yaw rate threshold Yref.

ROM 73 also has a memory block 73d storing a brake control program which mediates the yaw-dependent brake control according to the present invention. The controller may also be used for anti-skid brake control by which the braking pressure is held at near the wheel lock pressure so as to optimize braking characterisics of the vehicle. One such anti-skid brake control system has been disclosed in the European Patent First Publication No. 01 23 286. The contents of this European Patent First Publication are hereby incorporated by reference for the sake of disclosure.

Figure 4:
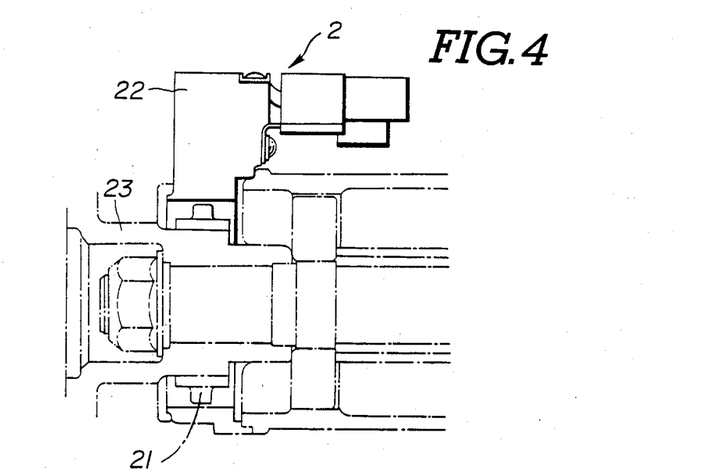
FIG. 4 is a side elevation of the vehicle speed sensor used in the preferred embodiment of the brake control system of FIG. 2.
Figure 5:
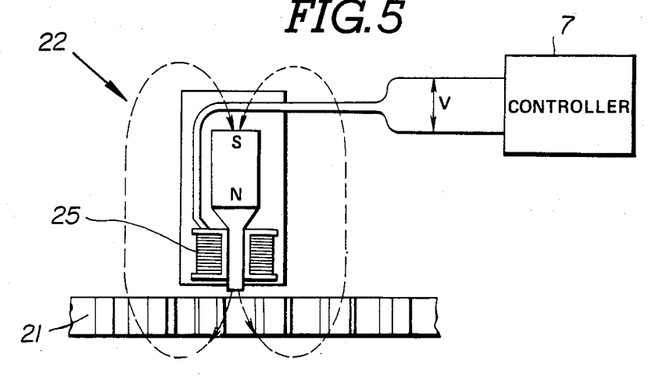
FIG. 5 is a diagram illustrating the operation of the vehicle speed sensor of FIG. 4.

FIGS. 4 and 5 show an example of the vehicle speed sensor 2. In order to monitor the rotation speed of the rear wheels, the vehicle speed sensor 2 is installed opposite a drive pinion shaft or a propeller shaft near a differential gear box. The vehicle speed sensor 2 comprises a sensor rotor 21 and a sensor assembly 22. The sensor rotor 21 is associated with a companion flange 23 which is, in turn, rigidly secured to the propeller shaft for rotation therewith. Thus, the sensor rotor 21 rotates with the propeller shaft. The sensor assembly 22 is fixed to a final drive housing or the differential gear box. The sensor assembly 22 outputs an alternating-current vehicle speed sensor signal having a frequency proportional to or corresponding to the average rotational speed of the rear wheels. The electromagnetic coil 25 of the sensor assembly 22 is connected to the controller 7 via the shaping circuit 4 to supply the vehicle speed sensor signals.

Figure 6:
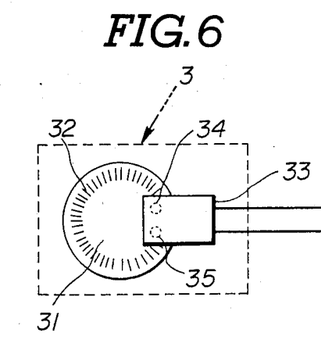
FIG. 6 shows the crucial components of the steering angle sensor used in the preferred embodiment of the brake control system of FIG. 2.
Figure 7:
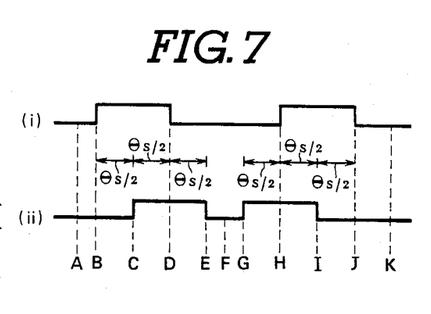
FIG. 7 is a diagram illustrating how the steering angle is derived from the output of the steering angle sensor of FIG. 6.

FIGS. 6 and 7 show an example of the steering angle sensor 3. As shown in FIG. 6, the steering angle sensor 3 includes a disc 31 fixedly mounted on a steering shaft (not shown) near the steering wheel (not shown) for rotation therewith. The disc 31 is formed with a plurality of slits 32 arranged radially symmetically about its circumference. Each slit 32 covers a sector $\theta s\alpha$ around the circumference and has an edge-to-edge separation from adjacent slits of $\theta s\alpha$, as shown in FIG. 7. A photointerrupter module 33 scans the disk and has a pair of interrupters 34 and 35. Each interrupter 34 and 35 emits a light beam through a corresponding slit 32a and 32b which has a span $\theta F$ on the same order to magnitude as $\theta s$ and receives the light beam passing through the corresponding slit 32a and 32b and through one of the slits of the disc 31. The photo interrupter module 33 produces two parallel pulse signals (i) and (ii) as shown in FIG. 7. The pulse signals have a phase difference of $\theta s/2$. The rotational direction of the vehiclar steering determines which of the two parallel signals (i) and (ii) leads in phase.

It should be noted that the phase separation between the photo interrupter 34 and 35 must agree with the following expression in order to yield an angular resolution of $\theta s/2$:

$$n \times \theta s + 5 \times \theta s/2; n = 0, 1, \ldots$$

In practice. the steering angle sensor 3 outputs a steering angle signal pulse after every 1° of steering angle variation.

This steering angle sensor has been disclosed in the co-pending U.S. patent application Ser. No. 580,174, now U.S. Pat. No. 4,581,607 filed on Feb. 18, 1984, which corresponds to the co-pending European patent application No. 84101645.4, filed on Feb. 18, 1984. The contents of the above-identified co-pending applications are hereby incorporated by reference.

The general principles of selecting and achieving optimal steering characteristics by the controller 7 will be described below with reference to FIGS. 8 and 9.

Figure 8:
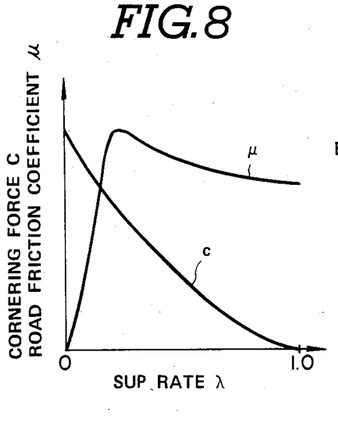
FIG. 8 shows a graph of cornering force c and of road surface friction $\mu$ versus slip rate $\lambda$.

FIG. 8 shows the variation of the cornering force C in relation to road friction $\mu$ and wheel slippage $\lambda$. As will be appreciated from FIG. 8, the cornering force C increases monotonically as when wheel slippage $\lambda$ decreases. Wheel slip occurs when the braking force equal to the product of the road friction $\mu$ and wheel load W is superceded by centrifugal force or other external forces. The braking pressure P corresponding to the product of the road friction $\mu$ and the wheel load W will be referred to hereafter as "lock pressure $P_{LOCK}$". Wheel slippage $\mu$ increases as braking pressure increases in excess of the lock pressure $P_{LOCK}$. As of wheel slippage $\lambda$ increases, cornering force C drops, which adversely effects vehicle steering control.

When the brakes are applied while cornering, wheel slippage $\lambda$ increases, thus lowering the cornering force. In addition, since the wheel load values W on the front and rear wheels usually differ the front and rear lock pressures $P_{LOCK}$ will also differ. Therefore, wheel slippage $\lambda_F$ of the front wheels will be different from wheel slippage $\lambda_R$ of the rear wheels. As a result, the cornering forces of the front and rear wheels will differ. This causes changing of steering characteristics by application of brake during cornering.

A stability factor A representative of vehicular steering characteristics while not braking and while braking respectively can be represented by the following equations:

NON-BRAKING STATE $$A_0 = -\frac{m}{2l^2} \cdot \frac{l_f K_{fo} - l_r K_{ro}}{K_{fo} \cdot K_{ro}} \quad (1)$$

BRAKING STATE $$A_B = -\frac{m}{2l^2} \cdot \frac{l_f(K_{fo} - \Delta K_f) - l_r(K_{ro} - \Delta K_r)}{(K_{fo} - \Delta K_f)(K_{ro} - \Delta K_r)} \quad (2)$$

where, in equation (1) and (2),
m is the vehicular weight;
l is the wheelbase;
$l_f$ is the distance between the front wheel and the center of gravity of the vehicle;
$l_r$ is the distance between the rear wheel and the center of gravity of the vehicle;
$K_{f0}$ and $K_{r0}$ are the cornering forces while not braking at the front and rear wheels respectively; and
$\Delta K_f$ and $\Delta K_r$ are the losses in cornering force at the front and rear wheels respectively due to wheel slip.

In order to simplify the explanation, it is assumed that $K_{f0} = K_0$ and $l_f = l_r = l/2$. In this case, the stability factor A in the non-braking state and in the braking state respectively can be expressed as follow:

NON-BRAKING STATE $$A_0 = 0$$

BRAKING STATE $$A_B = -\frac{m}{4l} \cdot \frac{\Delta K_r - \Delta K_f}{(K_0 - \Delta K_f)(K_0 - \Delta K_r)} \quad (3)$$

For consideration of the displacement of the center of gravity during braking, it is assumed that the vehicular weight distribution on the front wheels is $W_f$ and that on the rear wheels is $W_r$. It is also assumed that the distribution of the braking force on the front wheels is $F_{Bf}$ and that on the rear wheels is $F_{Br}$. If the relationship between the weight distribution and the braking force distribution is $W_f/W_r = F_{Bf}/F_{Br}$, the cornering force losses at the front and rear wheels will satisfy the equation as $\Delta K_f = \Delta K_r$. In this case, the vehicular steering characteristics are reflected by the stability factor A as follows:

$A > 0$ - - - understeer $A = 0$ - - - neutral steer and $A < 0$ - - - oversteer Therefore, if $\Delta K_r$ is greater than $\Delta K_f$, $A_B$ will be negative, that is, oversteering will occur. On the other hand, if $\Delta K_r$ is less than $\Delta K_f$, $A_B$ will be positive, that is, understeering will occur.

In another approach, it would be appreciated that front and rear wheels grip the road surface with transverse slip angles $\beta_f$ and $\beta_r$ during concering. With the transverse slip angle, cornering forces $C_f$ and $C_r$ are produced at the front and rear wheels. The cornering forces $C_f$ and $C_r$ can be represented by the following equations:

$$C_f = -K_f \times \beta_f$$

$$C_r = -K_r \times \beta_R$$

During cornering, the cornering forces $C_f$ and $C_r$ balance the centrifugal force applied to the vehicle so as to enable the vehicle negotiate the corner.

Applying the brakes results in some wheel slippage. Assuming the transverse slip angles $\beta_f$ and $\beta_r$ are constant, the cornering forces $C_f$ and $C_r$ are reduced. However, the cornering forces must still balance the centrifugal force. Therefore, when wheel slip occurs, one of the front and rear transverse slip angles $\beta_f$ and $\beta_r$ must increase. When the front wheel slip angle $\beta_f$ increases, the vehicle points toward the outside of the corner, i.e. understeer occurs. On the other hand, when the slip angle $\beta_r$ increases, the vehicle points toward the inside of the corner, i.e. oversteer occurs.

Figure 9:
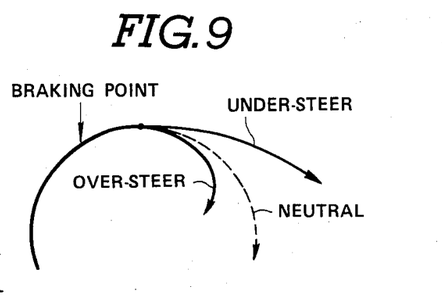
FIG. 9 is a diagram showing how vehicular steering characteristics change during cornering affected by braking.

Therefore, as shown in FIG. 9, when the braking force on the rear wheels is greater than that on the front wheels, the oversteer characteristics of the vehicle dominate. On the other hand, when the braking force on the front wheels exceeds that on the rear wheel, understeer characteristics dominate.

Therefore, it is possible to hold the steering characteristics constant even while braking through a corner by holding the cornering force losses $\Delta K_f$ and $\Delta K_r$ at both the front and rear wheels constant.

The above approach controls steering characteristics while cornering by monitoring the cornering forces on both front wheels of the vehicle. Comparable results can be obtained by controlling the braking pressure on the basis of the yaw rate of the vehicle. The preferred embodiment of the brake control system according to the present invention employs the yaw rate sensor 5 to monitor a parameter equivalent to the stability factor A.

In the preferred embodiment, the vehicle speed signal value V, the steering angle signal value ST and yaw rate signal value Y are sampled during operation. When the brakes are first applied, the instantaneous values of the vehicle speed signal value, the steering angle signal and the yaw rate signal are latched as initial values $V_0$, $ST_0$ and $Y_0$ respectively. The yaw rate threshold value Yref is derived from these initial values according to the following formula:

$$Y_{ref} = ST_t/ST_0 \times V_t/V_0 \times Y_0 \quad (4)$$

where
$St_t$ is the instantaneous value of the steering angle signal;
$V_t$ is the instantaneous value of the vehicle speed signal.

It should be noted that, in practice, the yaw rate threshold values Yref may be previously measured as a function of vehicle speed and steering angle and stored in the controller 7 in the form of a look-up table.

The absolute value of the yaw rate threshold value Yref derived as above is continuously compared to the absolute value of the yaw rate signal value Y in order to derive the difference $\Delta Y$. This difference $\Delta Y$ between the yaw rate signal value Y and the yaw rate threshold value Yref is then used as a parameter equivalent to the aforementioned stability factor A. Thus, a positive difference $\Delta Y$ reflects oversteer, and a negative difference $\Delta Y$ reflects understeer.

In practical operation, the difference $\Delta Y$ is compared with upper and lower threshold values $B_{refU}$ and $B_{refL}$. The upper threshold value $B_{refU}$ has a positive value and represents an understeer criterion. The lower threshold value $B_{refL}$ has a negative value and represents an oversteer criterion.

On the basis of the results of the aforementioned comparison between the difference $\Delta Y$ and the upper and lower threshold values $B_{refU}$ and $B_{refL}$, the braking pressures at front and rear wheels are controlled independently and according to the following schedule:

FOR REAR WHEEL

| | |
|---|---|
| $\Delta Y \geq B_{refU}$ | RELEASE MODE |
| $B_{refU} > \Delta Y > 0$ | HOLD MODE |
| $\Delta Y \leq 0$ | APPLICATION MODE |

FOR FRONT WHEEL

| | |
|---|---|
| $\Delta Y \leq B_{refL}$ | RELEASE MODE |
| $B_{refL} < \Delta Y < 0$ | HOLD MODE |
| $\Delta Y \geq 0$ | APPLICATION MODE |

Figure 10:
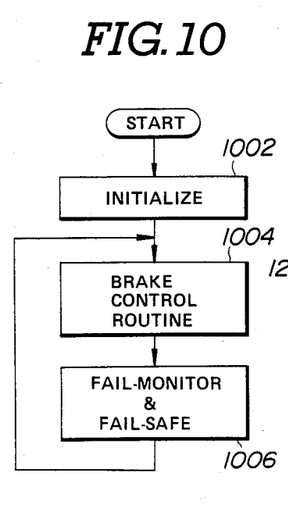
FIG. 10 is a flowchart of a main program executed by the controller of FIG. 3.
Figure 11:
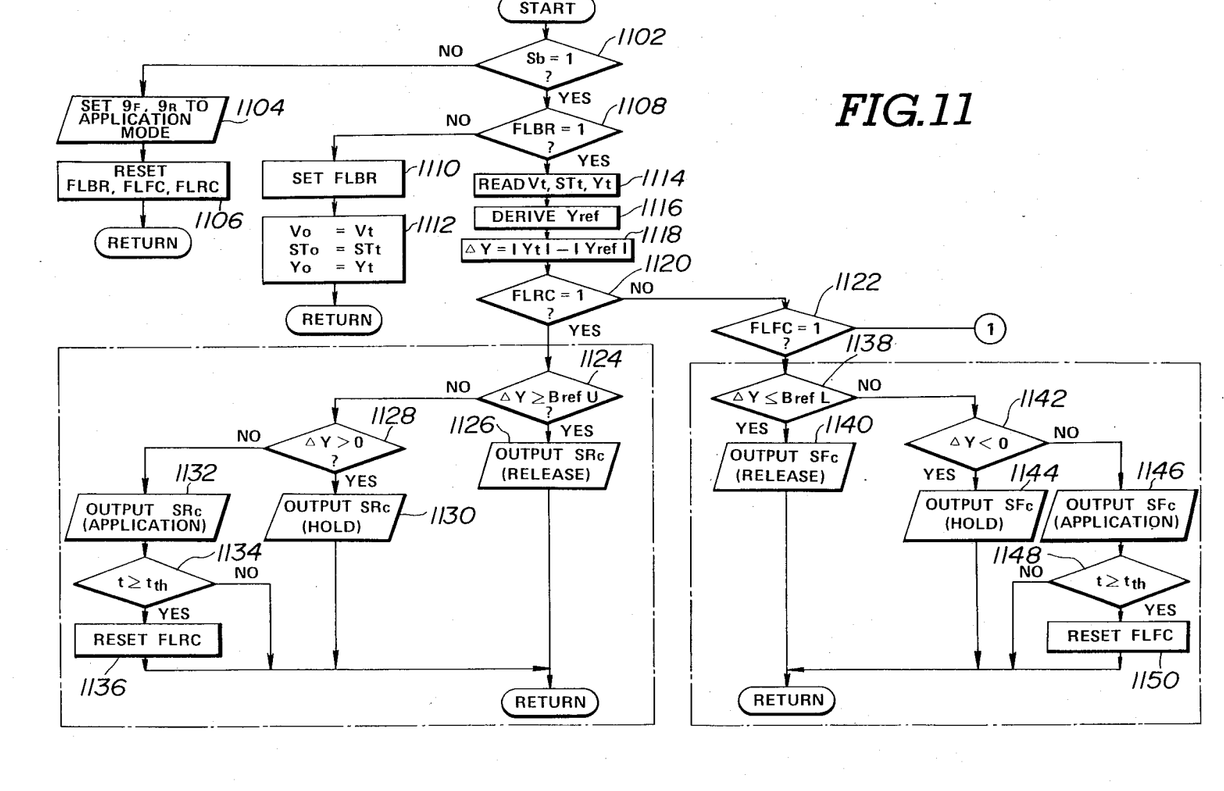
FIGS. 11 and 12 are flowcharts of sub-routines of the main program of FIG. 10.
Figure 12:
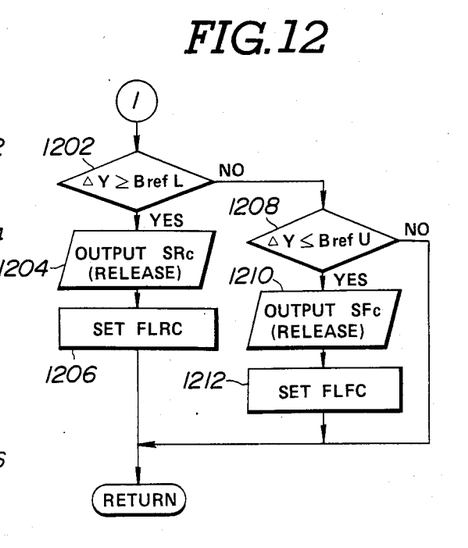

FIGS. 10 to 12 show the brake control programs executed by the microprocessor 7. FIG. 10 shows a main control program designed to be executed as a background job. The main control program of FIG. 10 is triggered by the closing of an ignition switch (not shown) acting as a main switch. Immediately after starting program execution, the system is initialized at a block 1002. After this, predetermined brake control operations are performed at a block 1004. The processes performed in the block 1004 include sampling the vehicle speed signal $V_t$, the steering angle signal $ST_t$ and the yaw rate signal $Y_t$. Other processes performed in the block 1004 will be described later with reference to FIG. 11. Failure-monitoring and fail-safing is performed at a block 1006. An example of failure-monitoring and fail-safing operations performed in the block 1004 has been disclosed in the co-pending U.S. patent application Ser. No. 601,295, filed on Apr. 17, 1984, which is assigned to the common assignee, and which corresponds to German patent application No. P 34 17 144.4 published under Publication No. 34 17 144, on Dec. 13, 1984. The contents of these co-pending prior applications are hereby incorporated by reference for the sake of disclosure.

The blocks 1004 and 1006 of the main control program are executed repeatedly at a fixed interval, e.g. 1 ms. The reiteration of the blocks 1004 and 1006 is governed by a timer built into the microprocessor.

FIG. 11 is a flowchart of a sub-routine executed at the block 1004 of the main control program of FIG. 10. In the sub-routine of FIG. 11, first, the braking state signal level is checked at a block 1102. If the brakes are not applied and thus the braking state signal level is LOW (0), the front and rear brake actuators 9F and 9R are set to APPLICATION mode to allow manual braking, at a block 1704. After this, the braking state flag FLBR, which is set in response to a HIGH level braking state signal Sb, the front brake control state flag FLFC, which is set when the brakes for the front wheels become active, and the rear brake control state flag FLRC, which is set when the brakes for the rear wheels become active, are all reset to zero at a block 1106. After the block 1106, control returns to the main control program of FIG. 10.

On the other hand, when the braking state signal level is HIGH (1) when checked at the block 1102, the braking state flag FLBR is checked at a block 1108. If the braking state flag FLBR has not been set, the flag FLBR is set at a block 1110. After setting the braking state flag FLBR at the block 1110, the current values of the vehicle speed signal $V_t$, the steering angle signal $ST_t$ and the yaw rate signal $Y_t$ are latched and stored as initial values $V_0$, $ST_0$ and $Y_0$ respectively, at a block 1112. After the block 1112, control returns to the main control program.

If the braking state indicative flag FLBR has previously been set when checked at the block 1108, the instantaneous values $V_t$, $ST_t$ and $Y_t$ of the vehicle speed signal SV, the steering angle signal Sst and the yaw rate signal Sy are read out from temporary registers 71a, 71b and 71c, which are continuously updated by the corresponding input signals, at a block 1114. The yaw rate threshold Yref is derived at a block 1116 on the basis of the read values $V_t$, $ST_t$ and $Y_t$. In the block 1116, the yaw rate threshold value Yref is derived by means of arithmetic operations according to the formula (4) or by table look-up. The absolute value of the yaw rate threshold value is compared to the absolute value of the instantaneous yaw rate signal value $Y_t$ read out at the block 1114 to derive their difference $\Delta Y$, at a block 1118.

After the block 1118, the rear brake control state flag FLRC is checked at a block 1120. If the rear brake control state flag FLRC is not set when checked at the block 1120, the front brake control flag FLFC is checked at a block 1122. If the front brake control flag FLFC is also reset, then control passes to a FLFC and FLRC setting routine, which is shown in FIG. 12 and will be described later.

On the other hand, if the rear brake controlling flag FLRC is set when checked at the block 1120, the difference $\Delta Y$ derived at the block 1116 is compared to the upper threshold value $B_{refU}$ at a block 1124.

If the difference $\Delta Y$ is equal to or greater than the upper threshold value $B_{refL}$, then, at a block 1126, the rear brake control signal SRc is output to operate the rear brake actuator 9R to the RELEASE mode position. Conversely, if the difference $\Delta Y$ is smaller than the upper threshold value $B_{refU}$, the difference $\Delta Y$ is checked to see if it is positive at a block 1128. If the difference $\Delta Y$ is positive when checked at the block 1128, then the rear brake control signal SRc is output to the rear brake actuator 9R to actuate the latter to the HOLD mode position at a block 1130. If the difference $\Delta Y$ is equal to or smaller than zero, then the rear brake control signal SRc orders the rear brake actuator 9R to the APPLICATION mode position at a block 1132. Elapsed time after the rear brake actuator 9R assumes the APPLICATION mode position is then measured. The measured elapsed time t is compared to a predetermined time-up threshold $t_{th}$ at a block 1134. As long as the elapsed time t is less than the time-up threshold, control returns to the main control program from block 1134. On the other hand, if the elapsed time reaches the time-up threshold at the block 1134, the rear brake control stage flag FLRC is reset at a block 1136. Then returns again to the main control program.

If the front brake controlling flag FLFC is set when checked at the block 1122, the difference $\Delta Y$ derived at the block 1116 is compared to the lower threshold value $B_{refL}$ at a block 1138. If the difference $\Delta Y$ is equal to or smaller than the lower threshold value $B_{refL}$, then, at a block 1140, the front brake control signal SFc is output to operate the front brake actuator 9F to the RELEASE mode position. Conversely, if the difference $\Delta Y$ is greater than the lower threshold value $B_{refL}$, the difference $\Delta Y$ is checked to see if it is negative at a block 1142. If the difference $\Delta Y$ is negative when checked at the block 1142, then the front brake control signal SFc is output to the front brake actuator 9F to operate the latter to the HOLD mode position at a block 1144.

If the difference ΔY is equal to or greater than zero, then the front brake control signal SFc orders the front brake actuator 9F to the APPLICATION mode position at a block 1146. Elapsed time after the front brake actuator 9F assumes the APPLICATION mode position is then measured. The measured elapsed time t is compared to a predetermined time-up threshold $t_{th}$ at a block 1148. As long as the elapsed time t is less than the time-up threshold, control returns to the main control program from block 1148. On the other hand, if the elapsed time reaches the time-up threshold when checked at the block 1148, the front brake control state flag FLFC is reset at a block 1150, and control is again returned to the main control program.

FIG. 12 shows the FLFC and FLRC setting routine which is executed when neither the front brake control state flag FLFC nor the rear brake control state flag FLRC is set when checked at the blocks 1120 and 1122. After starting execution, first, the difference ΔY is again compared with the upper threshold value $B_{refU}$ at a block 1202. If the difference ΔY is greater than the upper threshold value $B_{refU}$, the rear brake control signal SFc orders the rear brake actuator 9R to the RELEASE mode at a block 1204, and then the rear brake control state flag FLFC is set at a block 1206.

On the other hand, if the difference ΔY is equal to or less than the upper threshold value $B_{refU}$, the difference ΔY is again compared to the lower threshold value $B_{refL}$ at a block 1208. If the difference ΔY is equal to or greater than the lower threshold value $B_{refL}$, then control returns to the main program of FIG. 10. If the difference ΔY is less than the lower threshold value $B_{refL}$ when checked at the block 1208, the front brake control signal SRc orders the front brake actuator 9F to the RELEASE mode position at a block 1210, and then the front brake control state flag FLRC is set at a block 1212.

After execution of the blocks 1208 and 1212, control returns to the main control program of FIG. 10.

Although the aforementioned control program controls only one of the front and rear brake actuators during each cycle of program execution, it would be possible to control both the front and rear brake actuators within a single cycle of program execution. Furthermore, although the yaw rate sensor is employed to monitor a vehicle driving condition, it can be replaced with any sensors which can monitor vehicle driving condition indicative parameters equivalent to the stability factor as set forth above. For example, a sensor monitoring transverse forces (such as centrifugal pseudo-forces) can be used as a substitute for the yaw rate sensor.

Further modifications of the shown embodiment or other embodiments of the present invention which can be embodied without departing from the principles set out in the appended claims should be understood as being within the scope of the invention.

What is claimed is:

1. A brake control system for a wheeled vehicle comprising:

a first hydraulic brake circuit for applying braking pressure to vehicular front wheels, said first hydraulic circuit including a first braking pressure controlling actuator which operates to increase said braking pressure in a first position, to hold the braking pressure constant in a second position and to decrease the braking pressure in a third position;

a second hydraulic brake circuit for applying braking pressure to vehicular rear wheels, said second hydraulic circuit including a second braking pressure controlling actuator which operates to increase said braking pressure in a first position, to hold the braking pressure constant in a second position and to decrease the braking pressure in a third position;

a first sensor for producing a first sensor signal when the vehicle brakes are applied;

a second sensor for producing a second sensor signal having a value representative of the forces applied in the transverse direction to the vehicle;

a third sensor for producing a third sensor signal having a value representative of a vehicle driving condition, said vehicle driving condition being at least one of a vehicle speed and a steering angle; and a controller for controlling said first and second actuators independently of each other, said controller deriving a vehicle driving stability factor in response to said first sensor signal and as a function of said second and third sensor signal values and controlling said first and second actuators to one of said first, second and third positions so as to hold said vehicle driving stability factor at a given value.

2. The brake control system as set forth in claim 1, wherein said controller derives first and second threshold values on the basis of said second and third signal values, compares said vehicle driving stability factor with said first and second threshold values and controls said first and second actuators to one of said first, second and third positions in accordance with the results of said comparison.

3. The brake control system as set forth in claim 2, wherein said controller operates said first actuator to said third position when said vehicle driving stability factor value is less than said first threshold.

4. The brake control system as set forth in claim 2, wherein said controller operates said second actuator to said third position when said vehicle driving stability factor value is greater than said second threshold.

5. The brake control system as set forth in claim 2, wherein said controller operates said first actuator to said third position when said vehicle driving stability factor value is less than said first threshold, and operates said second actuator to said third position when said vehicle driving stability factor value is greater than said second threshold.

6. The brake control system as set forth in claim 1, wherein said third sensor comprises a vehicle speed sensor producing a vehicle speed indicative signal and a steering angle sensor producing a steering angle indicative signal.

7. The brake control system as set forth in claim 6, wherein said second sensor monitors a yaw rate of the vehicle to produce a second sensor signal indicative of the yaw rate.

8. The brake control system as set forth in claim 7, wherein second sensor monitors centrifugal forces applied to the vehicle and produces said second sensor signal indicative of said centrifugal forces.

9. The brake control system as set forth in claim 7, wherein said controller derives first and second threshold values on the basis of said second and third signal values, compares said vehicle driving stability factor value to said first and second threshold values and controls said first and second actuators to one of said first, second and third positions in accordance with the results of said comparison.

10. The brake control system as set forth in claim 9, wherein said controller operates said first actuator to said thid position when said vehicle driving stability factor value is less than said first threshold, and operates said second actuator to said third position when said vehicle driving stability factor value is greater than said second threshold.

11. The brake control system as set forth in claim 10, wherein said first threshold value is negative or zero and said second threshold value is positive.

12. The brake control system as set forth in claim 11, wherein said controller operates said first actuator to said second position when said vehicle driving stability factor value is in the range between said first threshold value and zero.

13. The brake control system as set forth in claim 11, wherein said controller operates said second actuator to said second position when said vehicle driving stability factora value is in the range between said second threshold value and zero.

14. The brake control system as set forth in claim 11, wherein said controller operates said first actuator to said second position when said vehicle driving stability factor value is in the range between said first threshold value and zero, and operates said second actuator to said second position when said vehicle driving stability factor value is in the range between said second threshold value and zero.

15. In an automotive vehicle having a brake system which includes a first brake circuit for applying braking pressure to front wheels, a second brake circuit for applying braking force to rear wheels and a steering system, a method for controlling steering characteristics to coincide with desired characteristics comprising the steps of:

monitoring vehicle driving conditions including whether or not vehicular brakes have been applied;
  deriving a steering characteristics coefficient on the basis of the monitored driving conditions;
  monitoring variation of the steering characteristics coefficient while vehicular brakes are applied to decelerate the vehicle;
  deriving a first and second threshold value on the basis of said vehicle driving conditions and said steering characteristics coefficient;
  comparing said steering characteristics coefficient with said first threshold value and controlling said first brake circuit so as to adjust braking pressure applied to said front wheels in such a manner that a difference of said steering characteristics coefficient and said first threshold value is maintained within a predetermined range for optimizing braking characteristics at said front wheels; and
  comparing said steering characteristics coefficient with said second threshold value and controlling said second brake circuit so as to adjust braking pressure applied to said rear wheels in such a manner that a difference of said steering characteristics coefficient and said second threshold is maintained within a given range for optimizing braking characteristics at said rear wheels.

16. The method as set forth in claim 15, in which said first brake is operated so as to decrease braking pressure when said steering characteristics coefficient is less than said first threshold.

17. The method as set forth in claim 15, in which said second brake circuit is operated so as to decrease braking pressure when said steering characteristics coefficient is greater than said second threshold.

18. The method as set forth in claim 15, in which said first brake circuit is operated so as to decrease braking pressure when said steering characteristics coefficient is less than said first threshold, and said second brake circuit is operated so as to decrease braking pressure when said steering characteristics coefficient is greater than said second threshold.

19. The method as set forth in claim 18, wherein said first threshold value is negative and said second value is positive.

20. The method as set forth in claim 19, wherein said braking pressure in said first brake circuit is held constant when said steering characteristics coefficient is in the range between said first threshold value and zero, and braking pressure in said second brake circuit is decreased when said steering characteristics coefficient is in the range between said second threshold value and zero.

21. The method as set forth in claim 20, in which yaw rate of the vehicle is monitored as a parameter representative of the vehicle driving conditions.

22. The method as set forth in claim 20, in which centrifugal force is monitored as a parameter representative of the vehicle driving conditions.

23. The method as set forth in claim 21, in which vehicle speed is monitored as an additional parameter representative of the vehicle driving conditions.

24. The method as set forth in claim 21, in which steering angular position is monitored as an additional parameter representative of the vehicle driving conditions.

25. A brake control system for a wheeled vehicle comprising:

a first hydraulic brake circuit for applying braking pressure to vehicular front wheels, said first hydraulic circuit including a first braking pressure controlling actuator which operates to increase said braking pressure in a first position, to hold the braking pressure constant in a second position and to decrease the braking pressure in a third position;
  a second hydraulic brake circuit for applying braking pressure to vehicular rear wheels, said second hydraulic circuit including a second braking pressure controlling actuator which operates to increase said braking pressure in a first position, to hold the braking pressure constant in a second position and to decrease the braking pressure in a third position;
  a first sensor for producing a first sensor signal when the vehicle brakes are applied;
  a second sensor for producing a second sensor signal having a value representative of the forces applied in the transverse direction of the vehicle;
  a controller for controlling said first and second actuators independently of each other, said controller deriving a vehicle driving stability factor from said first and second sensor signal value and controlling said first and second actuators to one of said first, second and third positions so as to hold said vehicle driving stability factor at a given value.

26. A brake control system for a wheeled vehicle comprising:

a first hydraulic brake circuit for applying braking pressure to vehicular front wheels, said first hydraulic circuit including a first braking pressure controlling actuator which operates to increase said braking pressure in a first position, and to decrease the braking pressure in a second position;

a second hydraulic brake circuit for applying braking pressure to vehicular rear wheels, said second hydraulic circuit including a second braking pressure controlling actuator which operates to increase said braking pressure in a first position and to decrease the braking pressure in a second position;

a first sensor for producing a first sensor signal when the vehicle brakes are applied;

a second sensor for producing a second sensor signal having a value representative of the forces applied in the transverse direction of the vehicle;

a controller for controlling said first and second actuators independently of each other, said controller deriving a vehicle driving stability factor from said first and second sensor signal value and controlling said first and second actuators to one of said first and second positions so as to hold said vehicle driving stability factor at a given value.

27. An automative vehicle having a brake system which includes a first brake circuit for applying braking pressure to front wheels, a second brake circuit for applying braking force to rear wheels and a steering system, a method for controlling steering characteristics to coincidence with desired characteristics comprising the steps of:

monitoring vehicle driving condition including whether or not vehicular brakes have been applied;

deriving a steering characteristics coefficient on the basis of the monitored driving conditions;

monitoring variations of the steering characteristics coefficient while vehicular brakes are applied to decelerate the vehicle;

deriving a first and second threshold value on the basis of said vehicular driving conditions and said steering characteristics coefficient;

comparing said steering characteristics coefficient with said first threshold value and controlling said first brake circuit so as to adjust braking pressure to applied to said front wheel in such a manner that a difference of said steering characteristics coefficient and said first threshold is maintained within a predetermined range for optimizing braking characteristics at said front wheel; and comparing said steering characteristics coefficient with said second threshold value and controlling said second brake circuit so as to adjust braking pressure to applied to said rear wheel in such a manner that a difference of said steering characteristics coefficient and said second threshold is maintained within a given range for optimizing braking characteristics at said rear wheel.

28. A brake control system for a wheeled vehicle comprising:

a first hydraulic brake circuit for applying pressure to vehicular front wheel, said first hydraulic circuit including a first braking pressure controlling actuator which operates to increase said braking pressure in a first position, and to decrease the braking pressure in a second position;

a second hydraulic brake circuit for applying braking pressure to vehicular rear wheel, said second hydraulic circuit including a second braking pressure controlling actuator which operates to increase said braking pressure in a first position and to decrease the braking pressure in a second position;

a first sensor for producing a first sensor signal when the vehicle brake are applied;

a second sensor for producing a second sensor signal having a value representative of the forces applied in the transverse direction of the vehicle;

a controller for controlling said first and second actuators independently of each other, said controller deriving a vehicle driving stability factor from said first sensor signal and said second sensor signal value and controlling said first and second actuators to one of said first and second position so as to hold said vehicle cornering stability factor at a desired optimum level.

29. A brake control system for a wheeled vehicle comprising:

a first hydraulic brake circuit for applying braking pressure to vehicular front wheels, said first hydraulic circuit including a first braking pressure controlling actuator which operates to increase said braking pressure in a first position, and to decrease the braking pressure in a second position;

a second hydraulic brake circuit for applying braking pressure to vehicular rear wheels, said second hydraulic circuit including a second braking pressure controlling actuator which operates to increase said braking pressure in a first position and to decrease the braking pressure in a second position;

a first sensor for producing a first sensor signal when the vehicle brakes are applied;

a second sensor for producing a second sensor signal having a value representative of the forces applied in the transverse direction of the vehicle;

a controller for controlling said first and second actuators independently of each other, said controller deriving a vehicle driving stability factor which is representative of a target yawing rate to be exerted on the vehicle, on the basis of said first sensor signal value and said second sensor signal value and controlling said first and second actuators to one of said first and second positions so as to hold the yawing rate to be exerted on the vehicle at said target yawing rate for maintaining vehicular cornering stability at a desired optimum level.

* * * * *